Figure 1:
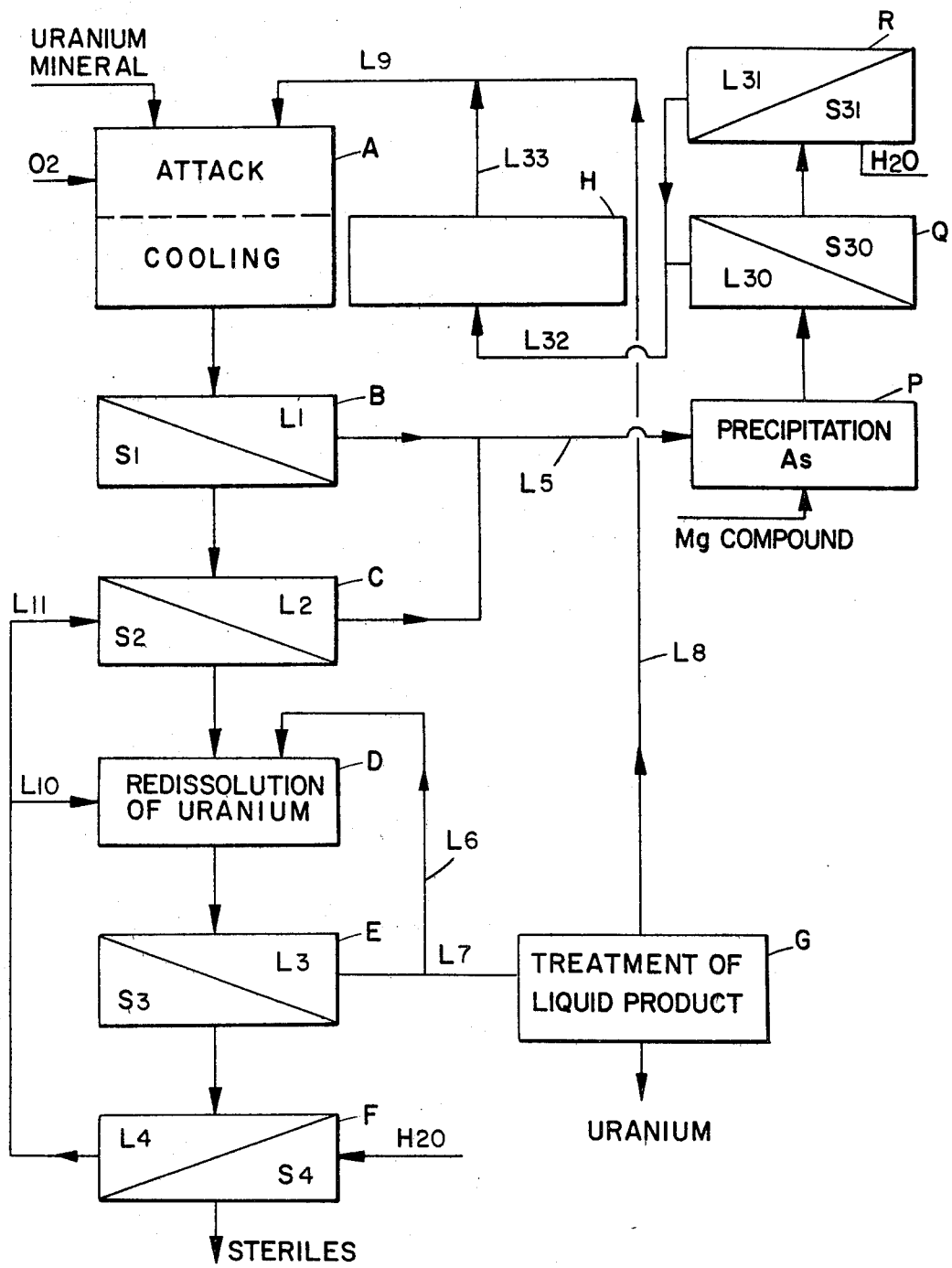

United States Patent [19]

Maurel

[11] 4,423,010
[45] Dec. 27, 1983

[54] PROCESS FOR THE SELECTIVE REMOVAL OF ARSENIC IN THE COURSE OF THE OXIDIZING ATTACK BY MEANS OF A CARBONATED LIQUOR ON A URANIFEROUS ORE CONTAINING SAME

[75] Inventor: Pierre Maurel, Aix-en-Provence, France

[73] Assignee: Aluminium Pechiney, Lyons, France

[21] Appl. No.: 399,699

[22] Filed: Jul. 19, 1982

[30] Foreign Application Priority Data

Jul. 29, 1981 [FR] France .................. 81 15065

[51] Int. Cl.³ .................. C22B 60/02; C22B 30/04
[52] U.S. Cl. ........................ 423/15; 423/17; 423/87
[58] Field of Search .............. 423/15, 17, 87

[56] References Cited

U.S. PATENT DOCUMENTS

| | | | |
|---|---|---|---|
| 2,199,696 | 5/1940 | Fleck | 423/15 |
| 2,951,741 | 9/1960 | Sill | 423/87 |
| 4,272,440 | 6/1981 | Sefton et al. | 423/18 |
| 4,366,128 | 12/1982 | Weir et al. | 423/87 |

FOREIGN PATENT DOCUMENTS 2404601 3/1979 France .
2462482 3/1981 France .

OTHER PUBLICATIONS

Bailer, J. C., et al., Editors, *Comprehensive Inorganic Chemistry* vol. 2, Pergamon Press, Ltd. Oxford, U.K. 1973, pp. 652-653.

Primary Examiner—Deborah L. Kyle
Assistant Examiner—Matthew A. Thexton
Attorney, Agent, or Firm—McDougall, Hersh & Scott

[57] ABSTRACT

A process for the selective removal of arsenical materials, in the course of a continuous hot oxidizing attack process, comprising attacking a uraniferous ore containing arsenical materials as impurities in the presence of an oxidizing agent in the reaction medium by means of an aqueous liquor formed by a recycling solution containing alkali metal carbonate and bicarbonate, and uranium close to the limit of solubility thereof, under concentration, temperature and pressure conditions which causes solubilization of the uranium present in the ore, and re-precipitation thereof in the attack medium, then collecting a suspension of a solid phase in a liquid phase which, after cooling, is subjected to a separation operation, recycling the liquid phase to the attack operation, and treating the separated solid phase by means of an aqueous liquor to re-dissolve the precipitated uranium which is characterized in that the arsenic which is solubilized in the attack operation is extracted by means of a magnesium compound which is introduced in an amount which is at least equal to the stoichiometric amount required to cause precipitation of magnesium arsenate.

6 Claims, 3 Drawing Figures

PROCESS FOR THE SELECTIVE REMOVAL OF ARSENIC IN THE COURSE OF THE OXIDIZING ATTACK BY MEANS OF A CARBONATED LIQUOR ON A URANIFEROUS ORE CONTAINING SAME

The present invention concerns selective purification in respect of arsenical materials in the course of a continuous process for the oxidising attack on a uraniferous ore containing arsenic as an impurity, by means of an aqueous recycling liquor containing in a dissolved condition alkali metal carbonate and bicarbonate as well as uranium in a concentration close to the limit of its solubility at the attack temperature, and for recovery of the precipitated uranium within the solid phase remaining after the attack operation.

It has long been known for the alkaline attack on uraniferous ores containing alkaline-earth metal carbonates such as calcium carbonate in substantial quantities to be effected preferentially by means of an aqueous liquor of sodium carbonate and bicarbonate, the concentration of those two components in the liquor being increased in proportion to increasing refractoriness of the ore.

The attack operation is generally carried out in an oxidising medium produced for example by blowing free oxygen into the hot reaction medium in order to permit oxidation of the uranium and solubilisation thereof, but also to ensure oxidation of the sulphides of impurities, and the organic materials present in the ore.

In the specialist literature, the level of concentrations of reactants in the attack liquor is generally low and this, in the case of attacking a refractory uraniferous ore, results in the level of efficiency in regard to solubilisation of the uranium being generally poor.

A known way of increasing the degree of solubilisation efficiency is to use an attack liquor which has higher levels of reactant concentration. In that case, the liquor which is collected after the attack operation still has a large amount of unreacted $CO_3^=$ and $HCO_3^-$ ions, the presence of which becomes increasingly troublesome, in the subsequent operation of extracting the uranium and in the operation of removing the solubilised impurities from the liquor resulting from the ore attack operation, as the levels of concentration of such ions rise, as the liquor produced by the uraniferous ore attack operation is then treated by a conventional method for extracting the uranium therefrom.

Generally, the liquor after the attack operation is treated by means of a solution of sodium hydroxide in order to precipitate the uranium in the form of sodium uranate. However, the man skilled in the art is well aware that the presence of a substantial amount of $CO_3^=$ and $HCO_3^-$ ions in the liquid resulting from the attack operation requires a large amount of NaOH to be used to neutralise the $HCO_3^-$ ions, and gives rise to a substantial increase in the degree of solubility of uranium in the medium, which reduces the amount of sodium uranate which can be collected by precipitation. The mother liquor which has a reduced uranium content but which contains the impurities solubilised in the attack operation is subjected to a purification and regeneration treatment before being recycled to the ore attack operation.

A treatment of this kind was described by the French Pat. No. 2 404 601 and additions Nos. 2 433 482 and 2 433 480. That treatment comprises treating the liquor resulting from the attack operation, with a reduced uranium content, at a temperature which is at most equal to boiling temperature, with the amount of lime required for converting the carbonates present into sodium hydroxide, then effecting separation of a precipitate which essentially comprises calcium carbonate and organic and inorganic calcium salts and the sodium hydroxide-enriched liquor, concentrating that liquor until precipitation of sodium sulphate occurs, and recovering a sodium hydroxide-rich liquor, of which a part is recycled to the operation of precipitating the sodium uranate while the part is carbonated by bringing it into contact with carbon dioxide gas and recycled to the ore attack operation.

If the attack liquid is concentrated in respect of reactants, the liquor after the attack operation, with a reduced uranium content, requires the use, for purification and regeneration thereof before recycling, of substantial amounts of lime for total caustification, and a high rate of consumption of $CO_2$ for regeneration of the recycled liquor. If the liquor resulting from the attack operation is to be processed on an ion-exchange resin for recovering the uranium, the presence of substantial amounts of $CO_3^=$ and $HCO_3^-$ ions in the liquor is a serious disadvantage and may even make it impossible to fix the uranium on the resin.

Hence, the processes described in the specialist literature reveal a contradiction as between the conditions for solubilisation of the uranium by the attack liquor and the conditions for restoring that uranium by the liquor after the attack operation. Finally, the presence in the liquors of organic materials which are solubilised in the attack operation causes the formation of uraniferous complexes, some of which are not soluble in the operation of washing the solid sterile fraction and are accordingly entrained therewith, thus reducing the level of efficiency in regard to uranium recovery.

In consideration of all those disadvantages, the applicants, in French Pat. No. 2,462,482, described a process for the continuous attack on uraniferous ore in a divided form in the presence of an oxidising agent in the reaction medium by means of an aqueous liquor of alkali metal carbonate and bicarbonate under concentration, temperature and pressure conditions which cause solubilisation of the uranium present in the ore, comprising recovery of asuspension of a solid phase in a liquid phase, and separation of the solid phase from the liquid phase, which comprises the following steps:

(a) the attack liquor is formed by the liquid phase containing in solution alkali metal carbonate and bicarbonate and uranium in a concentration close to the limit of solubility thereof at the attack temperature, separated from the suspension resulting from the attack operation, re-adjusted in respect of attack reactants, and recycled to the ore attack operation, (b) the uranium in the ore is solubilised during the attack operation which is carried out at a temperature of lower than 300° C. by the attack liquor in which the uranium is maintained in a state of saturation and is then immediately re-precipitated in the attack medium, (c) the suspension collected after the attack operation is cooled to a temperature which is still higher than 40° C., (d) the solid phase which is separated from the suspension resulting from the attack operation and which is formed by the sterile matter and precipitated uranium is treated by means of an aqueous liquor in order on the one hand to recover the impregnation liquor resulting from the attack operation and on the other hand to re-dissolve the precipitated uranium, and (e) the suspension resulting from re-dissolution of the uranium is subjected to an operation for separation thereof into a solid fraction which, after washing, is formed by the sterile matter and a useful uraniferous liquor.

Whereas the prior processes involved making the uranium and a part of the impurities contained in the ore soluble in the attack liquor and then, after removal of the sterile matter, treating the uraniferous liquor to extract the uranium therefrom, the process described in the main patent is found to be the reverse of the prior art, since it comprises solubilising and then precipitating the uranium in the attack medium, removing the uranium from the attack medium with the sterile matter in the form of a solid phase, and then separating the uranium from the sterile matter by re-dissolving it in a suitable aqueous liquor.

However, it may happen that the uraniferous ores contain arsenic, which is a particularly troublesome impurity, the major part of the arsenic in the ores being solubilised in the attack operation in the form of alkali metal arsenate, while the other fraction which occurs in a refractory arsenical form is insensitive to the attack operation and is removed with the sterile matter.

Hence, and in accordance with the attack process described in French Pat. No. 2 462 482, the absence of any treatment for removing the arsenic which is solubilised during the attack operation gives rise to major disadvantages which may have a detrimental effect on the quality of the materials produced.

In fact, the suspension resulting from the attack operation, when subjected to a separation operation, provides for recovery of the solid and liquid phases. The liquid phase which contains, in a dissolved condition, alkali metal carbonate and bicarbonate, uranium at a level of concentration close to the limit of solubility thereof at the temperature of the attack operation and finally, arsenic which is solubilised in the attack operation, constitutes the liquor for attacking the ore, which, in the present continuous process, becomes increasingly enriched with arsenic and makes it difficult to produce a uraniferous precipitate in a sufficient state of purity.

The solid phase which is formed by the sterile matter and the precipitated uranium is impregnated with a liquor which has an increasing concentration of arsenic, and it becomes difficult to remove the arsenic by a conventional washing operation. The above-mentioned solid phase which is treated by means of an aqueous liquor to recover the impregnation liquor and to re-dissolve the precipitated uranium results in the formation of an impure uraniferous production liquor which, in that condition, is no longer capable of subsequently providing a uraniferous precipitate in an acceptable state of purity.

Various treatment processes which are known to the man skilled in the art have been suggested in an attempt to solve that problem, which arises by virtue of the presence of arsenic in the uraniferous production liquors. Thus, it has been envisaged that the liquor which is recycled to the attack operation may be subjected to caustification. However, such a process not only results in the removal of arsenic in the form of calcium arsenate but also results in removal of the carbonates present. Hence, and after such a treatment, the liquor which is recycled to the attack operation is not suitable for that purpose unless the alkali metal carbonate and bicarbonate content thereof is restored before the attack operation.

In addition, applying such a process to removing arsenic from solutions which also contain alkali metal carbonate and bicarbonate does not permit selective extraction of the arsenic and leaves the user faced with serious disadvantages such as the formation of a precipitate which contains calcium arsenate and carbonate in the form of a mixture.

Hence, although the calcium arsenate present in the solid effluent has a low degree of solubility, nonetheless such calcium arenate may give rise to environmental pollution and may require particular and expensive precautions to be taken for storage thereof, by virtue of its being mixed with the other salts removed.

It therefore appears to be a desirable and attractive proposition for the arsenic to be selectively extracted in a form which permits it to be put to use or which permits it to be stored in an easy and non-polluting manner.

It is for this reason that, continuing their research in this field, the applicant has now found that it was possible to extract the arsenic by means of a novel process which overcomes the above-indicated disadvantages.

The process according to the invention for extracting arsenic which is solubilised in an operation of attacking uraniferous ore containing same, by means of a continuous hot oxidising attack process comprising attacking the uraniferous ore in a divided form in the presence of an oxidising agent in the reaction medium by means of an aqueous liquor formed by a recycling solution containing alkali metal carbonate and bicarbonate as well as uranium in an amount close to the limit of solubility thereof, under concentration, temperature and pressure conditions which cause solubilisation of the uranium present in the ore, and re-precipitation thereof in the attack medium, then collecting a suspension of a solid phase in a liquid phase which, after cooling, is subjected to a separation operation, treating the solid phase which is separated by means of an aqueous liquor to re-dissolve the precipitated uranium, is characterised in that said arsenic which is solubilised in the attack operation is extracted by means of a magnesium compound which is introduced in an amount which is at least equal to the stoichiometric amount required to cause precipitation of magnesium arsenate.

Introducing a magnesium compound into the arsenical medium to be treated causes precipitation of magnesium arsenate which can be extracted from the medium by a solid-liquid separation operation, whereupon the solid phase containing the magnesium arsenate precipitate can be washed with water or with a recycling liquor.

The magnesium compound may be introduced into the medium to be treated in any region of the process described in French Pat. No. 2 462 482. The magnesium compound may be introduced either into the region in which the uraniferous ore attack operation is carried out, or into the region in which the uranium precipitated in the attack operation is re-dissolved, or into all or part of the liquor which is recycled to the attack operation after separation from the solid phase formed by the sterile matter and precipitated uranium, or finally into all or part of the production liquor which is produced by re-dissolution of the uranium, before or after it has been subjected to treatment for extracting the uranium therefrom.

When the magnesium compound is introduced into the attack region, the magnesium arsenate precipitate is extracted from the production cycle by separation of the solid and liquid phases forming the suspension produced in the attack operation.

In other words, the solid phase which is separated in the above-indicated manner is formed by sterile matter, uranium which is precipitated in the ore attack operation, and magnesium arsenate.

After the solid phase has been thus separated and impregnated with the liquid phase resulting from the ore attack operation, it is then subjected to a washing operation using water or a recycling liquor, and then the impregnation liquor which is displaced by the treatment is returned for example to the attack operation.

When the magnesium compound is introduced into a treatment region other than the ore attack region, the resulting magnesium arsenate precipitate is collected by means of a solid-liquid phase separation operation. As discussed above, the separated solid phase is subjected to a washing operation using water or a recycling liquor, in order to extract from the precipitate the impregnation liquor that has been retained. The washing liquid is then recycled to a selected point in the production cycle.

The magnesium compound may be introduced into the medium to be treated in the form of an aqueous solution or in the form of a finely dispersed aqueous suspension or in the form of a powder, and the magnesium compound may be selected from the group formed by compounds such as dolomite, magnesite, magnesium salts, and magnesium oxides and hydroxide.

The temperature at which the arsenical medium is treated with the magnesium compound is lower than 100° C. and is preferably from 50° C. to 97° C.

The amount of magnesium compound generally used for precipitating the arsenic is close to the stoichiometric amount required to remove it in the form of magnesium arsenate.

When the amount of magnesium compound is greater than the stoichiometric amount, the excess magnesium is collected in the form of a precipitate of magnesium basic carbonate and/or hydroxide, at the same time as the magnesium arsenate precipitate.

The magnesium arsenate precipitate which is generally separated from the treated medium may be subjected to a washing operation to collect the impregnation mother liquor, the liquor collected after the washing operation being re-introduced into the production cycle.

As described in the French Pat. No. 2,462,482, the oxidising attack on uraniferous ores is effected in the presence of an oxidising agent. In general, the oxidising agent is oxygen which is blown into the reaction medium, in the form of oxygen-enriched air or just oxygen alone. The oxygen partial pressure in the reaction vessel is from 0.1 to 40 bars but preferably from 5 to 15 bars.

However, the oxidising medium for the uraniferous ore attack operation may also be produced by introducing an oxidising agent which is liquid or solid under normal conditions, such as potassium permanganate, sodium dioxide or sodium persulphate.

The aqueous attack liquor which is a recycled liquor is formed by the liquid phase resulting from the uraniferous ore attack. Experience has shown that, when the uraniferous ore attack operation is carried out by means of an aqueous liquor containing alkali metal carbonate and bicarbonate and uranium at a level of concentration close to the limit of solubility thereof at the attack temperature, the uranium in the ore is solubilised and then immediately precipitated in the attack medium, on the sludge formed by the sterile matter.

The alkali metal carbonate and bicarbonate used as reactants for attacking uraniferous ores are in practice sodium, potassium and ammonium carbonate and bicarbonate.

Depending on the nature of the ore, the concentration of the liquor for the attack operation may vary within wide limits in regard to each of the reactants present. Thus, the concentration in respect of $HCO_3^-$ may vary between 0 and 220 g/l but preferably between 15 g/l and 80 g/l, while the concentration in respect of $CO_3^=$ may vary between 10 g/l and 90 g/l but preferably between 20 g/l and 60 g/l, and the concentration in respect of uraniferous ions may vary between 0.5 g/l and 10 g/l and more generally between 1 and 5 g/l.

The range of temperatures used for the attack operation has been the subject of particular study by the applicants who found with considerable interest that, when the level of concentration of attack reactants is maintained at a constant value, the solubility of the uranium decreased in the attack medium when the attack temperature was increased.

Thus, the applicants were able to verify that the operation of attacking the uraniferous ore must be performed at the highest possible temperature in order to promote the attack mechanism, and reduce the level of concentration of uranium in the attack liquor, that is to say, promote precipitation of uranium in the attack medium.

In practice, the uraniferous ore attack temperature does not exceed 300° C. and is preferably between 120° C. and 240° C.

The duration of the attack operation depends on the nature of the ore and the attack temperature and is generally from a few minutes to 6 hours and may reach 15 hours in the case of refractory ores, even if the attack operation is carried out at elevated temperature.

In accordance with a particular arrangement, in the case of some ores, it may be found advantageous for a normal oxidation catalyst to be introduced into the reaction medium, to improve the attack mechanism.

The suspension resulting from the attack operation is subjected to cooling to reduce its temperature to a value of from 40° C. to 100° C. The cooling step may be carried out using known means such as for example expansion and/or exchange in a counter-flow mode between the suspension issuing from the attack operation and the suspension passing into the attack operation. It must be effected rapidly so that the precipitated uranium does not experience substantial re-dissolution in the attack liquor. When cooling is effected by expansion, a certain amount of water is evaporated, depending on the temperature used in the attack operation.

When the cooling operation is carried out in its entirety by means of direct heat exchange between the two suspensions, as already stated above, there is no evaporation effect.

The solid phase which is separated from the suspension resulting from the ore attack operation and which is formed by sterile matter and precipitated uranium is impregnated with the attack liquor. In order to remove the impregnation liquor, the solid phase is treated by means of an aqueous liquor to recover the impregnation liquor from the attack operation, and re-dissolve the precipitated uranium.

In accordance with a first alternative procedure, the operation of recovering the impregnation liquor and the operation of re-dissolving the precipitated uranium are effected simultaneously by means of the same aqueous liquor.

In accordance with a second alternative procedure, recovery of a major part of the impregnation liquor from the solid phase produced in the attack operation and re-dissolution of the precipitated uranium as well as the minor part of the impregnation liquor are effected successively by means of the same aqueous liquor or aqueous liquors of different compositions.

The aqueous liquors used for recovery of the impregnation liquor and re-dissolution of the precipitated uranium mainly contain from 0 to 15 g/l of $CO_3^=$, from 0 to 50 g/l of $CO_3H^-$ and from 0 to 10 g/l of uranium.

Re-dissolution of the uranium is generally effected at a temperature of from 40° C. to 80° C.

The impregnation liquor which is extracted in this way is then recycled to the attack operation, while the suspension resulting from re-dissolution of the uranium is subjected to separation into a solid fraction which, after washing, is formed by the sterile matter and a useful uraniferous liquor. A minor part of the useful uraniferous liquor may be recycled to the operation of re-dissolving the uranium or to the attack operation, while the other major part is treated by means of a known process for extracting uranium. The water for washing the sterile matter, after re-dissolution of the uranium, may form an aqueous recycling liquor containing uranium, carbonate and bicarbonate ions and impurities, in a dissolved condition. It may be divided into two fractions, the first being used for washing the solid phase and the second being used for re-dissolution of the precipitated uranium in the solid phase.

The process according to the invention may also include one or more previous treatment of the ore, before the ore is subjected to the actual attack operation, under the above-indicated conditions.

Firstly, it may be found necessary for the ore to be subjected not to a normal crushing operation but to a crushing operation which is taken to a particularly advanced stage, in order to multiply the interfaces between the grains of the ore and the attack liquor.

Likewise, when dealing with some ores, it may be advantageous to remove the organic substances contained in the liquor after the ore attack operation, either after separation of the solid phase containing the sterile matter and the precipitated uranium, or on the suspension resulting from the attack operation, that is to say, before separation of the liquid and solid phases. In that case, the elimination operation is carried out by means of an oxidising agent such as for example ozone, sodium persulphate or potassium permanganate, or by anodic oxidation.

However, it is not out of the question for the organic substances to be removed in a preliminary operation by controlled-temperature calcination of the ore before it is subjected to the attack operation.

It may also be found advantageous to carry out a treatment, prior to the attack operation, for physical enrichment of the ore, using the methods which are known to the man skilled in the art such as for example flotation.

Finally, the uraniferous production liquor is subjected to a process for putting the uraniferous ions to use, by means of a process known to the man skilled in the art such as precipitation, solvent extraction, ion exchange extraction, etc., while the liquor with its reduced uranium content may undergo various treatments such as caustification, removal of molybdenum and vanadium, removal of sulphate ions, carbonation, etc., before being recycled to the ore attack operation.

Figure 2:
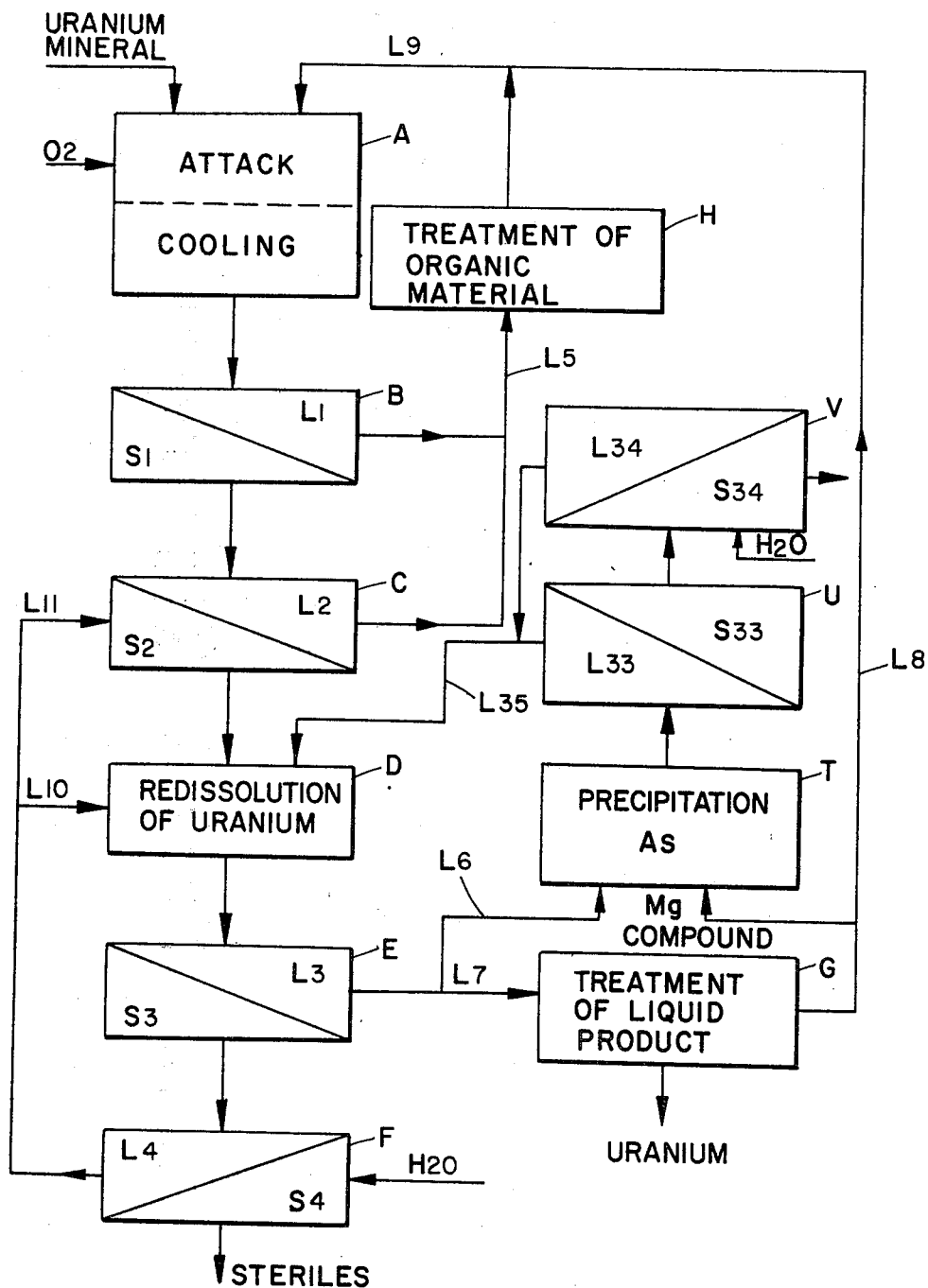
Figure 3:
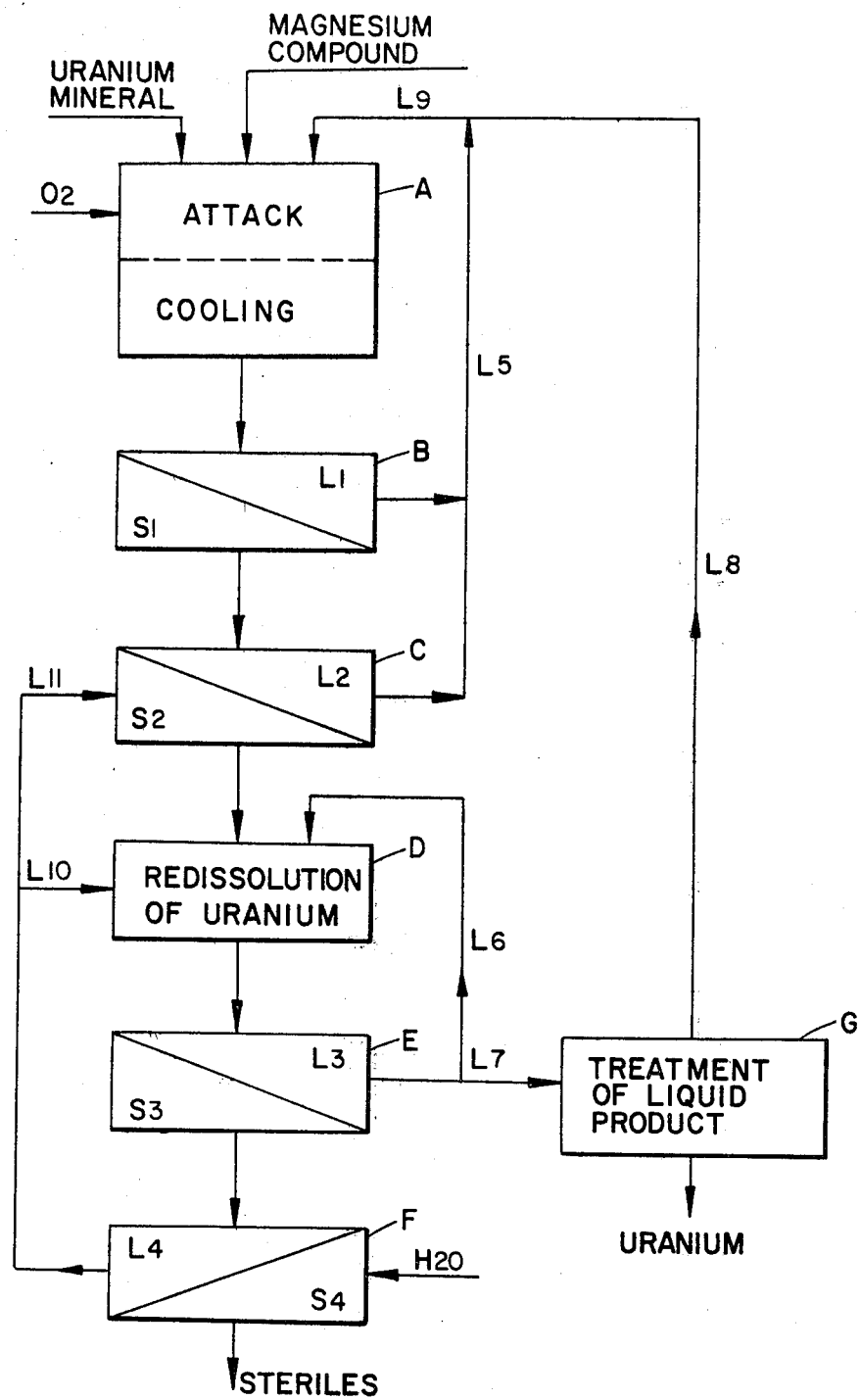

The invention will be better appreciated by referring to the description of FIGS. 1 and 2 representing modes of operation, and FIG. 3, representing a numerical example.

FIG. 1 is a diagrammatic view of the process according to the invention for the attack on a uraniferous ore which also contains arsenic and organic materials, wherein the selective removal of arsenical materials is carried out on the liquor for recycling to the attack operation, FIG. 2 is a diagrammatic view of the process according to the invention for attacking a uraniferous ore which also contains arsenic and organic materials, wherein the selective removal of arsenical materials is carried out on the uranium production liquor which is recycled to the re-dissolution operation, and FIG. 3 is a diagrammatic view of the process according to the invention, for attacking a uraniferous ore containing arsenic, wherein the selective removal of arsenical material is carried out in the ore attack region.

Referring to FIG. 1, the uraniferous ore which is in divided form and which contains troublesome organic and arsenical materials is introduced at A with the attack liquor $L_9$ at the same time as oxygen is blown into the reaction medium. After cooling, the slurry produced after the attack operation is introduced into B for separation of a cake $S_1$ formed by the mixture of the sterile fraction and the uranium precipitate, and the aqueous liquor $L_1$ which contains, in solution, alkali metal carbonate and bicarbonate, uranium and organic materials which were solubilised in the attack operation.

The mother liquors of the cake $S_1$ are displaced in C by means of a recycled washing liquor $L_{11}$.

The mixture $L_5$ of the liquors $L_1$ and $L_2$ is displaced in P where the arsenical materials are precipitated by means of a magnesium compound.

The suspension resulting from precipitation in P is then introduced into Q for separation of a cake $S_{30}$ which essentially comprises magnesium arsenate and a liquor $L_{30}$ which is recycled to H. The mother liquors of the cake $S_{30}$ are displaced in R by means of water which is introduced, and the liquor $L_{31}$ resulting therefrom is combined with the liquor $L_{30}$, forming the liquor $L_{32}$ which is displaced in H where the organic materials are treated by means of an oxidising agent, giving a purified liquor $L_{33}$.

The cake $S_2$ resulting from the washing operation in C is introduced into D for re-dissolution of the uranium precipitate in a suitable liquor formed by the mixture of two recycled liquors $L_{10}$ and $L_6$.

The liquor $L_{10}$ is of the same composition as the above-mentioned liquor $L_{11}$. When re-dissolution of the uraniferous ions is concluded, the resulting slurry is treated in E, for separation of a cake $S_3$ and a liquor $L_3$.

The cake $S_3$ which is essentially formed by sterile matter is displaced to F where it is subjected to washing with water, with the washing liquor $L_4$ being recycled to C and D, as fractions $L_{10}$ and $L_{11}$.

The liquor $L_3$ which has a high content of dissolved uranium, in the form of an alkali metal uranyl carbonate, is divided into two unequal fractions, one fraction $L_6$ being recycled to D for re-dissolution of the uranium, while the other fraction $L_7$, which is the larger fraction, forms the production liquor from which the uranium is extracted in G by a process which is not described herein, while the resulting liquor $L_8$ with its reduced uranium content and freed of the impurities resulting from the uraniferous ore by a known process which is not described herein, is recycled to A to form, in mixture with the liquor $L_{33}$, the attack liquor $L_9$.

Referring to FIG. 2, the uraniferous ore which is in a divided form and which contains troublesome organic and arsenical materials and the recycled attack liquor $L_9$ are introduced into the reaction vessel A at the same time as oxygen is blown into the reaction medium.

The suspension resulting from the attack operation is partly cooled by expansion, with removal of a certain amount of water, and then introduced into B for separation of a cake $S_1$ which is formed by the mixture of the sterile fraction and the uranium precipitate and an aqueous liquor $L_1$ which contains, in solution, alkali metal carbonate and bicarbonate and uranium.

The mother liquors of the cake $S_1$ are displaced in C by means of a recycled washing liquor $L_{11}$.

The mixture of liquors $L_1$ and $L_2$ is then displaced to H for treatment of the organic materials by means of an oxidising agent, giving a purified liquor.

The resulting cake $S_2$ which is extracted from C is introduced into D for re-dissolution of the uranium precipitate in a suitable liquor formed by the mixture of two recycled liquors $L_{10}$ and $L_{35}$.

The liquor $L_{10}$ is of the same composition as the above-mentioned liquor $L_{11}$. When re-dissolution of the uraniferous ions is concluded, the resulting slurry is treated in E for separation of a cake $S_3$ and a liquor $L_3$.

The cake $S_3$ which essentially comprises the sterile matter is displaced to F where it is subjected to washing with water, with recycling of the washing liquor $L_4$ to C and D, as fractions $L_{10}$ and $L_{11}$.

The liquor $L_3$ which has a high content of dissolved uranium in the form of alkali metal uranyl carbonate is divided into two unequal fractions, one fraction $L_6$, being the smaller, and the other fraction $L_7$, which is the larger fraction, forms the production liquor from which the uranium is extracted in G by a process which is not described herein, while the resulting liquor $L_8$ with a reduced uranium content and freed of the impurities originating from the uraniferous ore by a known process which is not described herein is recycled to A in order to form, mixed with the liquor $L_5$ from which the organic materials have been removed, the attack liquor $L_9$.

The liquor $L_6$ is displaced to T for precipitation of the arsenical materials by means of a magnesium compound.

The suspension resulting from precipitation in T is introduced into U for separation of a cake $S_{33}$ which essentially comprises magnesium arsenate and a liquor $L_{33}$ which is intended to be recycled to the operation of re-dissolving uranium in D.

The mother liquors of the cake $S_{33}$ are displaced in V by means of water which is introduced, and the liquor $L_{34}$ resulting therefrom is combined with the liquor $L_{33}$ forming the liquor $L_{35}$ which is introduced into D for re-dissolution of the uranium.

EXAMPLE (illustrated in FIG. 3)

A uraniferous ore which is of the following composition expressed in terms of percent by weight, after drying, is treated in accordance with the process of the present invention:

Uranium—0.2%
Molybdenum—0.12%
$SiO_2$—77.8%
$Al_2O_3$—12.1%
$Fe_2O_3$—2.64%
MgO—0.01%
CaO—0.12%
$Na_2O$—0.3%
$K_2O$—2.0%
$TiO_2$—0.33%
Arsenic—0.04%
S—0.2%
Various—4.14%

1000 kg of the above-indicated dry ore was crushed to a grain size of 160$\mu$ and then introduced into an autoclave A with 1170.9 kg of an aqueous attack liquor $L_9$ of the following composition:

U—7.5 g/l
$Na_2CO_3$—50.9 g/l
$NaHCO_3$—81.6 g/l
$Na_2SO_4$—117.8 g/l
Mo—19.1 g/l
As—2.7 g/l 1.4 kg of magnesium sulphate was then introduced into the autoclave A, in solid form.

The autoclave was heated in such a way that the reaction medium was at a temperature of 220° C., while oxygen was injected at an average flow rate of 0.7 $Nm^3/h$, which bubbled into the pulp. The total pressure obtaining in the autoclave during the oxidising attack operation was 35 bars.

After a residence time of 40 minutes at a temperature of 220° C. (the time elapsed between the beginning of the operation of introducing oxygen and the end of the attack operation), the slurry was expanded and cooled to a temperature of 60° C., with 20 kg of water being given off in the form of vapour, and was then filtered in B, giving a solid phase $S_1$ and a liquid phase $L_1$.

The liquor $L_1$ from the separation step B represented a mass of 728.2 kg, and was of the following composition:

U—8.6 g/l
$Na_2CO_3$—39.9 g/l
$NaHCO_3$—85.0 g/l
$Na_2SO_4$—130.0 g/l
Mo—20.7 g/l
As—2.8 g/l

The solid phase $S_1$ formed by the mixture of the sterile fraction and the sodium uranyl carbonate and magnesium arsenate precipitates was impregnated with mother liquors which were extracted in C by means of 300 kg of an aqueous recycling liquor $L_{11}$ which was of the following composition:

U—4.76 g/l
$Na_2CO_3$—10.5 g/l
$NaHCO_3$—22.4 g/l
$Na_2SO_4$—34.3 g/l
Mo—5.48 g/l
As—0.74 g/l

The $S_1$ impregnation mother liquors which are thus entrained gave a liquor $L_2$ representing a mass of 300 kg, of the following composition:

U—8.53 g/l
Na$_2$CO$_3$—39.6 g/l
NaHCO$_3$—83.9 g/l
Na$_2$SO$_4$—128.3 g/l
Mo—20.4 g/l
As—2.7 g/l which was combined with L$_1$, giving a liquor L$_5$ which weighed 1028.2 kg.

The liquor L$_5$ was mixed with the liquor L$_8$ originating from G, forming the liquor L$_9$ which was recycled to the ore attack operation in A.

The solid phase S$_1$ from which the impregnation mother liquors were removed gave a cake S$_2$ which was transferred into D for re-dissolution therein of the sodium uranyl carbonate precipitate.

The cake S$_2$ which weighed 1427.3 kg, contained, in kg:

U—3.365 kg
Na$_2$CO$_3$—7.4 kg
NaHCO$_3$—15.7 kg
Na$_2$SO$_4$—24.1 kg
Mo—3.876 kg
Arsenic—0.872 kg
Impregnation H$_2$O—366.6 kg
Sterile matter—1005.4 kg The cake S$_2$ was then treated in D with the mixture of two aqueous liquors L$_{10}$ and L$_6$.

The liquor L$_{10}$ weighed 298.6 kg and was of the same composition as the liquor L$_{11}$ which was used for displacement of the impregnation mother liquor at C.

The liquor L$_6$, which is the recycling liquor, represented a mass of 100 kg, and was of the following composition in g/l:

U—6.9 g/l
Na$_2$CO$_3$—15.0 g/l
NaHCO$_3$—32.1 g/l
Na$_2$SO$_4$—49.3 g/l
Mo—7.92 g/l
As—1.06 g/l

When re-dissolution of the sodium uranyl carbonate was completed, the resulting slurry was displaced to E for separation of a cake S$_3$ and an aqueous liquor L$_3$.

The mother liquor-impregnated cake S$_3$ was treated in F where it was washed with 521.7 kg of water, with recycling of the liquor L$_4$ which was then divided into the liquor L$_{10}$ for re-dissolution of the uranium in D and the liquor L$_{11}$ for displacement of the liquor impregnating the solid phase S$_1$, in C.

The cake S$_4$ representing a water-impregnated mass of 1346.9 kg was discharged from F. The cake S$_4$ had a residual uranium content of 68 ppm, and contained 0.362 kg of arsenic and 350 kg of impregnation water, the remainder being the weight of the sterile matter.

402 kg of the liquor L$_3$ for re-dissolution of the sodium uranyl carbonate was collected at the discharge from E.

The above-indicated liquor L$_3$ was divided into two unequal fractions:

one fraction, being the liquor L$_6$, representing a mass of 100 kg, was recycled to D, as already described above, and the other fraction, being the liquor L$_7$, representing a mass of 302 kg, formed the production liquor which was passed to G and from which the uranium was extracted by a process which is not described herein, while the resulting liquor L$_8$ from which the impurities had been removed was recycled to the attack operation in A to form, with the liquor L$_5$, the above-mentioned attack liquor L$_9$.

I claim:

1. In a process for the selective removal of arsenical materials, in the course of a continuous hot oxidizing attack process, comprising attacking a uraniferous ore containing arsenical materials as impurities in the presence of an oxidizing agent in the reaction medium by means of an aqueous liquor formed by a recycling solution containing alkali metal carbonate and bicarbonate, and uranium close to the limit of solubility thereof, under concentration, temperature and pressure conditions which cause solubilization of the uranium and arsenic present in the ore, and re-precipitation of uranium values in the attack medium, collecting a suspension of a solid phase in a liquid phase, cooling the suspension, separating the solid phase from the liquid phase, recycling the liquid phase to the attack operation, and treating the separated solid phase by means of an aqueous liquor to re-dissolve the precipitated uranium, the improvement comprising introducing a magnesium compound into one of the solutions containing arsenic in an amount which is at least equal to the stoichiometric amount required to cause precipitation of magnesium arsenate.

2. A process for the selective removal of arsenical materials, as claimed in claim 1, in which the magnesium compound is introduced in the ore attack operation.

3. A process for the selective removal of arsenical materials, as claimed in claim 1, in which the magnesium compound is introduced into the step for re-dissolution of the precipitated uranium.

4. A process for the selective removal of arsenical materials, as claimed in claim 1, in which all or part of the liquor which is recycled to the attack operation, is treated with the magnesium compound.

5. A process for the selective removal of arsenical materials, as claimed in claim 1, in which all or part of the liquor which issues from the operation of re-dissolving the uranium, is treated with a magnesium compound.

6. A process for the selective removal of arsenical materials, as claimed in claim 1, in which the magnesium compound is selected from the group consisting of dolomite, magnesite, magnesium salts and magnesium oxides and hydroxides.

* * * * *